UNITED STATES PATENT OFFICE.

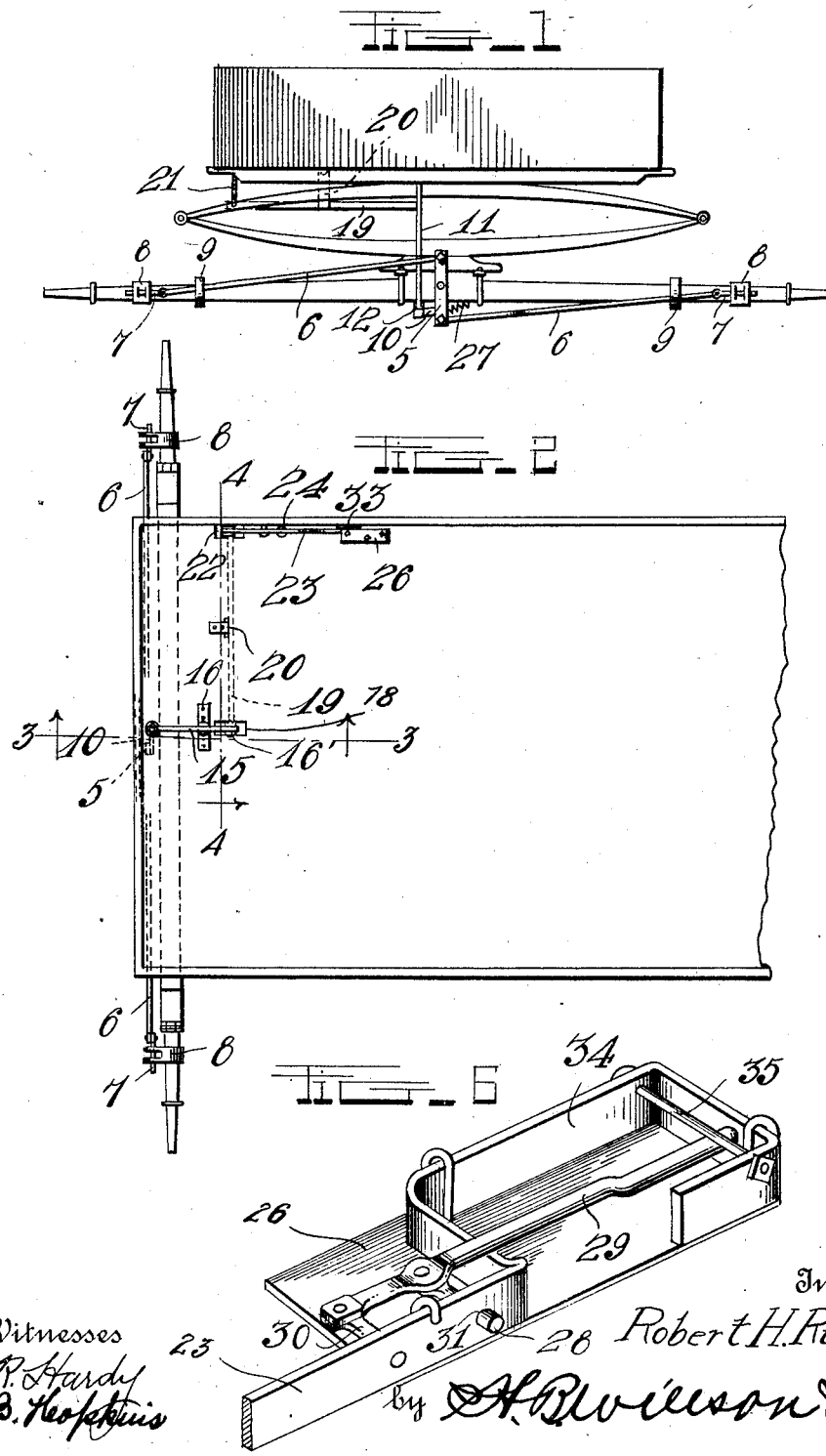

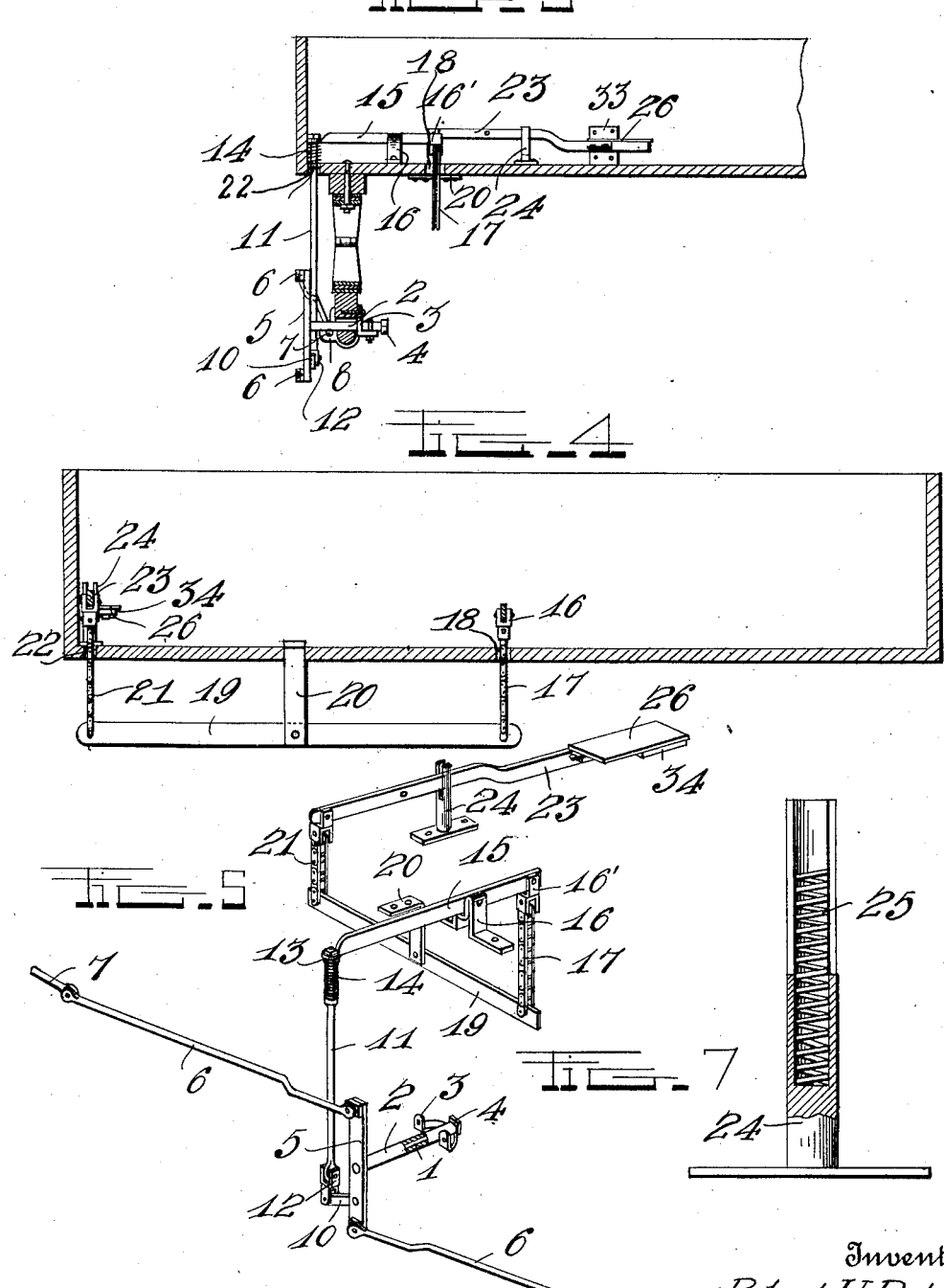

ROBERT H. RICHARDSON, OF SPARTA, NORTH CAROLINA, ASSIGNOR OF ONE-HALF TO B. C. WADDELL, OF SCOTTVILLE, NORTH CAROLINA.

HORSE-DETACHING DEVICE.

997,007.  Specification of Letters Patent.  Patented July 4, 1911.

Application filed October 20, 1910.  Serial No. 588,163.

*To all whom it may concern:*

Be it known that I, ROBERT H. RICHARDSON, a citizen of the United States, residing at Sparta, in the county of Alleghany and State of North Carolina, have invented certain new and useful Improvements in Horse-Detaching Devices; and I do declare the following to be a full, clear, and exact description of the invention, such as will enable others skilled in the art to which it appertains to make and use the same.

This invention relates to improvements in horse detaching devices for vehicles.

One object of the invention is to provide a simple and inexpensive horse detaching device which may be readily applied to a vehicle for the purpose of quickly releasing a runaway horse, thereby preventing injury to the vehicle or its occupants.

Another object is to provide a horse detaching device which will be strong and durable in construction, efficient and reliable in operation and which is provided with means for locking the same against operation.

With the above and other objects in view the invention consists of certain novel features of construction, combination and arrangement of parts as will be more fully described and particularly pointed out in the appended claim.

In the accompanying drawings: Figure 1 is a front end view of a wagon body and running gear of a vehicle showing the application of the invention therewith; Fig. 2 is a top plan view of the front end of the wagon body with parts broken away showing the arrangement of the device; Fig. 3 is a vertical longitudinal section on the line 3—3 of Fig. 2; Fig. 4 is a vertical cross section on the line 4—4 of Fig. 2; Fig. 5 is a perspective view of the device removed from the vehicle showing the parts in their proper relative positions; Fig. 6 is a perspective view of the under side of the operating lever and treadle showing the construction and arrangement of the treadle locking mechanism. Fig. 7 is a detail vertical sectional view through the tubular supporting base and spring for the operating lever.

In the embodiment of the invention I provide a supporting rock shaft 1, which is revolubly mounted in a bearing sleeve 2. The sleeve 2 is here shown and is preferably engaged with an aperture formed in the bolster of the front axle midway between the ends of the same. The sleeve 2 is secured in position by means of a clip 3 which is bolted or otherwise secured to the axle bolster as shown. The inner end of the shaft 1 is preferably threaded to receive a nut 4 whereby the shaft is held in operative engagement with the sleeve. On the outer end of the shaft is secured a cross head 5 to the opposite ends of which are pivotally connected the inner ends of pin retracting bars 6 the outer ends of which have pivotally connected thereto coupling pins 7 which are adapted to engage the thill couplings 8 arranged on the opposite ends of the axle and thereby pivotally connect the thills or shafts to the axle. The bars 6 are preferably slidably supported near their outer ends by suitable guiding and supporting clips 9 arranged on the axle as shown.

To the cross head 5 near one end thereof is rigidly secured a short arm or lug 10 to the outer end of which is secured the lower end of an operating rod 11 the upper end of which projects through an aperture in the bottom of the vehicle body as shown. The lower end of the rod 11 is connected to the arm 10 by a swivel joint 12. On the upper portion of the rod 11 is secured a stop collar above which and between the same and a washer 13 is arranged a coiled spring 14. With the upper end of the rod which projects through the bottom and into the body of the vehicle is connected the forward end of a lever 15 which is pivoted in a suitable bracket 16 secured to the bottom of the vehicle body as shown. The forward end of the lever 15 is secured to the upper end of the rod above the washer 13 by a nut or similar fastening device as shown. To the rear end of the lever 15 is loosely connected as by a swivel joint 16' the upper end of a short chain 17 which projects and works through a slot 18 in the bottom of the wagon body and is connected at its lower end to one end of a lever 19 which is pivotally mounted in a bracket or hanger 20 secured to the bottom of the vehicle and projecting a suitable distance below the same as shown. To the opposite end of the lever 19 is connected the lower end of a chain 21 the upper end of which extends upwardly through a slot 22 formed in the bottom of the wagon body and is connected at its upper end to the forward end of an operating lever 23 which is pivoted by a suitable pivot bolt to the inner surface of the right side of the vehicle body in convenient reach of the driver.

The rear portion of the operating lever 23 is yieldingly supported in the bifurcated upper end of a tubular post 24 which is suitably secured to the bottom of the vehicle and has arranged therein a coiled cushioning spring 25 upon which the rear portion of the operating lever rests and by means of which said lever and the parts connected thereto are restored to their normal position after being operated. On the rear end of the lever 23 is arranged a foot treadle 26 adapted to be engaged by the driver's foot whereby the lever 23 may be rocked. In thus rocking the lever the forward end thereof is raised which movement will draw upwardly on the chain 21 thus rocking the lever 19 which movement of the lever will pull downwardly on the chain 17 thus rocking the lever 15. In thus rocking the lever 15 the forward end thereof will pull upwardly on the operating rod 11 said rod thus swinging the cross head 5 in the proper direction for retracting the rods 6 and the pins 7 thereon out of engagement with the thill couplings and thus disconnecting the thills or shafts from the vehicle. After the parts have thus been operated to release the thills and pressure has been removed from the operating lever the cross head 5 will be swung back to its normal position and the bars 6 and pins 7 again projected by means of a spring 27 which is connected at one end to the lower end of the cross head and at its opposite end to the bolster or other portion of the axle.

In order to lock the operating lever against movement and thus prevent the accidental releasing or disengagement of the shafts or thills or the tampering with the device, I provide a suitable locking mechanism for the rear end of the operating lever, said mechanism comprising a locking pin 28 which is secured to and projects at right angles from an operating rod 27, the forward end of which is pivotally connected to a bracket 30 arranged on and projecting laterally from one side of the rear end of the lever 23. The pin 28 is adapted to be projected and retracted through a guide aperture 31 formed in the lever 23 and into engagement with a locking aperture formed in the adjacent side of the vehicle body or in a keeper plate 23 arranged on said side of the body. The free end of the operating rod 29 projects rearwardly and is bent upwardly to a slight extent into an inclosure formed by offsetting and bending the rear end of the lever 23 into the form of a rectangular loop 34 as clearly shown in Fig. 6 of the drawing. Through the opposite sides of the loop 34 is arranged a guiding and supporting bolt 35 with which the free end of the rod 29 is engaged. The rectangular loop 34 formed on the inner end of the lever 23 also serves as a support for the foot treadle 26 which is secured thereto by hook bolts or other suitable fastening means. By arranging the rod 29 below the treadle and having the free end of the rod disposed in the rectangular loop the rod and locking mechanism will be hidden from view so that when the parts are locked against operation the same will not be readily released or tampered with by unauthorized persons. When it is desired to lock or release the operating lever it is simply necessary for the driver to reach beneath the treadle plate and grasp the rod 29 whereupon the locking bolt may be readily projected or retracted to locked or released positions.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claim.

Having thus described my invention what I claim is:

In a horse detaching device for vehicles, a suitably mounted rock shaft, a cross head on the outer end of said shaft, pin projecting rods connected to the opposite ends of said cross head, thill coupling pins connected to the outer ends of said rods and adapted to be engaged with the thill couplings of the vehicle, means to project and hold said coupling pins in operative engagement with the thill couplings, a pivotally mounted operating lever, a series of levers and flexible connections between said operating lever and said operating rod, a treadle arranged on said operating lever, a locking mechanism whereby said lever may be locked against operation, said locking mechanism comprising a lever pivoted to said operating lever beneath said treadle, and a locking pin carried by said lever and adapted to be projected thereby into locking engagement with the side of the vehicle body.

In testimony whereof I have hereunto set my hand in presence of two subscribing witnesses.

ROBERT H. RICHARDSON.

Witnesses:
   RUFUS A. DOUGHTON,
   A. S. CARSON.

---

Copies of this patent may be obtained for five cents each, by addressing the "Commissioner of Patents, Washington, D. C."